United States Patent
Tsukamoto

(10) Patent No.: US 9,654,182 B2
(45) Date of Patent: May 16, 2017

(54) APPARATUS FOR WIRELESSLY COMMUNICATING WITH AND SUPPLYING POWER TO ANOTHER APPARATUS, ELECTRONIC APPARATUS, AND METHOD FOR CONTROLLING POWER SUPPLY

(71) Applicant: CANON KABUSHIKI KAISHA, Tokyo (JP)

(72) Inventor: Nobuyuki Tsukamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 14/272,236

(22) Filed: May 7, 2014

(65) Prior Publication Data

US 2014/0337643 A1 Nov. 13, 2014

(30) Foreign Application Priority Data

May 9, 2013 (JP) ................ 2013-099550

(51) Int. Cl.
  *H02J 17/00* (2006.01)
  *H04B 5/00* (2006.01)
  *G06F 1/26* (2006.01)
  *H02J 7/02* (2016.01)

(52) U.S. Cl.
  CPC ............ *H04B 5/0037* (2013.01); *H02J 17/00* (2013.01); *G06F 1/26* (2013.01); *H02J 7/025* (2013.01)

(58) Field of Classification Search
  CPC .......... H04B 5/0037; H02J 7/025; H02J 50/80
  See application file for complete search history.

(56) References Cited

U.S. PATENT DOCUMENTS

| 2009/0230777 A1* | 9/2009 | Baarman ................. H01F 38/14 307/104 |
| 2010/0225272 A1 | 9/2010 | Kirby et al. |
| 2012/0212072 A1* | 8/2012 | Miyabayashi ....... H04B 5/0037 307/104 |
| 2015/0155918 A1* | 6/2015 | Van Wageningen . H04B 5/0031 307/104 |

FOREIGN PATENT DOCUMENTS

| CN | 101964552 A | 2/2011 |
| CN | 102684317 A | 9/2012 |
| CN | 103036282 A | 4/2013 |
| JP | 2010-039283 A | 2/2010 |
| JP | 2011517926 A | 6/2011 |
| JP | 2013038854 A | 2/2013 |
| WO | 2012169794 A2 | 12/2012 |

* cited by examiner

*Primary Examiner* — Albert Wang
(74) *Attorney, Agent, or Firm* — Canon U.S.A., Inc. IP Division

(57) ABSTRACT

A power supply apparatus includes a power supply unit configured to wirelessly supply power to an electronic apparatus, a communication unit configured to wirelessly communicate with the electronic apparatus, a setting unit configured to set the power to be supplied to the electronic apparatus, based on data indicating a category of power receivable by the electronic apparatus, and a control unit configured to perform processing for supplying the power set by the setting unit to the electronic apparatus via the power supply unit.

16 Claims, 11 Drawing Sheets

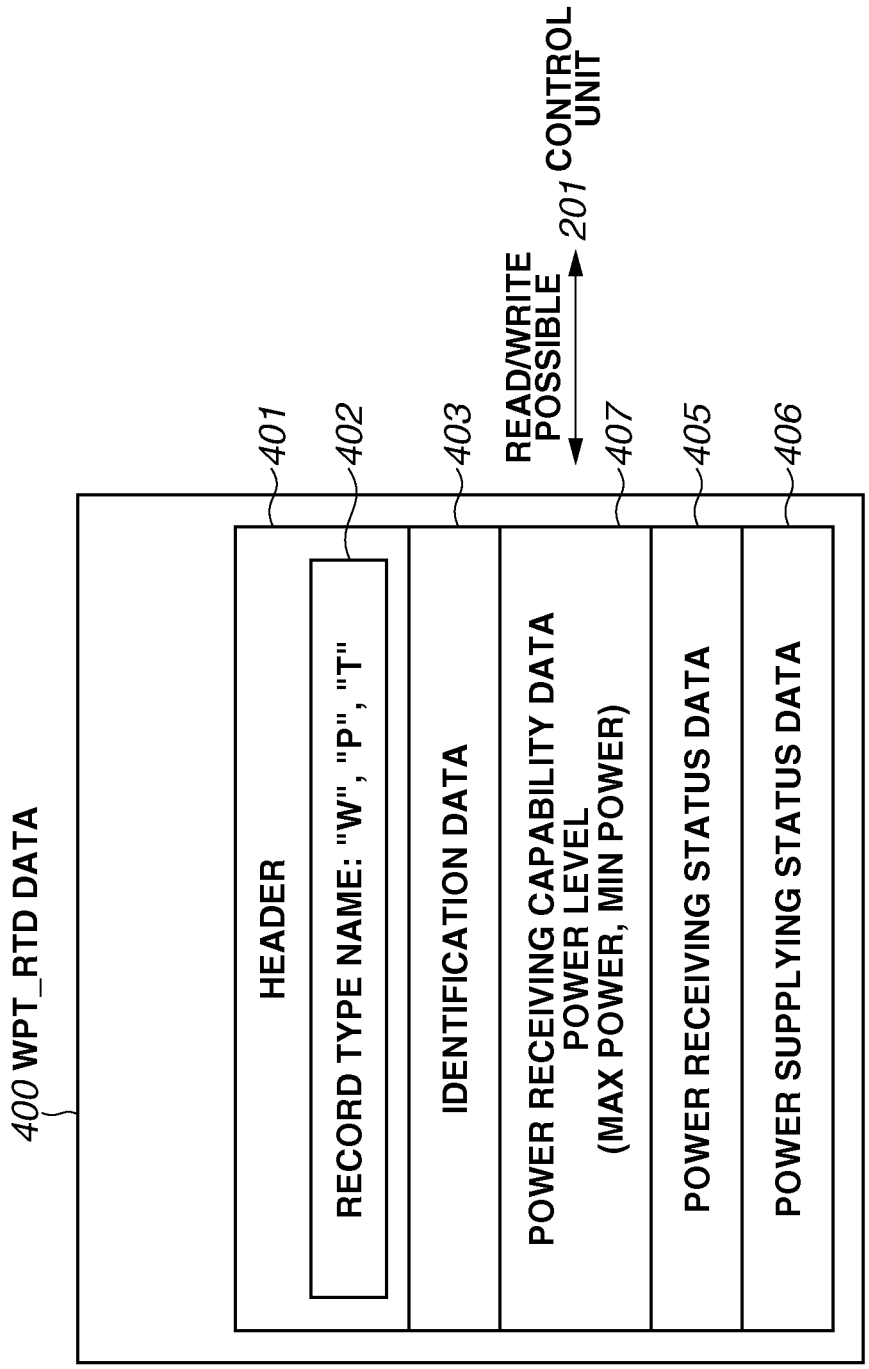

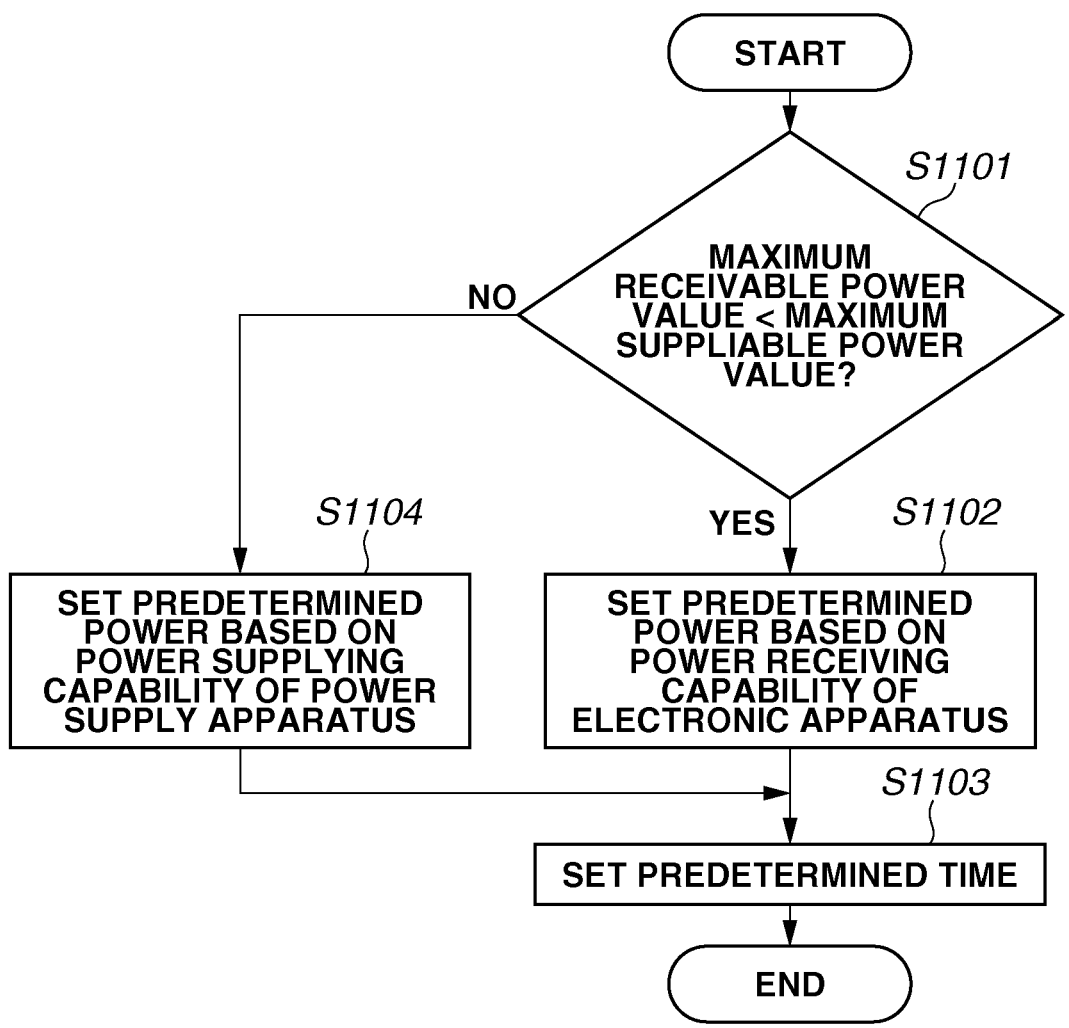

US 9,654,182 B2

APPARATUS FOR WIRELESSLY COMMUNICATING WITH AND SUPPLYING POWER TO ANOTHER APPARATUS, ELECTRONIC APPARATUS, AND METHOD FOR CONTROLLING POWER SUPPLY

BACKGROUND

Field

Aspects of the present invention generally relate to a power supply apparatus for wirelessly supplying power.

Description of the Related Art

In recent years, there has been known a power supply system including a power supply apparatus for wirelessly supplying the power without connection via connectors, and an electronic apparatus for receiving the power wirelessly supplied from the power supply apparatus. Japanese Patent Application Laid-Open No. 2010-39283 discusses an electronic apparatus charging a battery by the power supplied from a power supply apparatus in such a power supply system.

In such a power supply system, it has not been considered that the power supply apparatus and the electronic apparatus communicate with each other, and the power supply apparatus controls wireless power supply based on the result of the communication with the electronic apparatus. Therefore, the power supply apparatus has been unable to correctly detect the function and status of the electronic apparatus, and accordingly unable to suitably control the power supply to the electronic apparatus.

SUMMARY

Aspects of the present invention are generally directed to a power supply apparatus capable of suitably supplying power to an electronic apparatus through the communication between the power supply apparatus and the electronic apparatus.

According to an aspect of the present invention, a power supply apparatus includes a power supply unit configured to wirelessly supply power to an electronic apparatus, a communication unit configured to wirelessly communicate with the electronic apparatus, a setting unit configured to set, based on data indicating a category of power receivable by the electronic apparatus received from the electronic apparatus, power to be supplied to the electronic apparatus, and a control unit configured to perform processing for supplying power set by the setting unit to the electronic apparatus via the power supply unit.

According to another aspect of the present invention, a power supply apparatus includes a power supply unit configured to wirelessly supply power to an electronic apparatus, a communication unit configured to wirelessly communicate with the electronic apparatus, a setting unit configured to set, based on data indicating a category of power receivable by the electronic apparatus received from the electronic apparatus by the communication unit, power to be supplied to the electronic apparatus, and a control unit configured to perform process for supplying power set by the setting unit to the electronic apparatus via the power supply unit.

Further features of the present disclosure will become apparent from the following description of exemplary embodiments with reference to the attached drawings.

BRIEF DESCRIPTION OF THE DRAWINGS

FIG. 10 illustrates an example of WPT_RTD data according to a second exemplary embodiment.

FIG. 11 is a flowchart illustrating an example of setting process performed by a power supply apparatus according to the second exemplary embodiment.

DESCRIPTION OF THE EMBODIMENTS

Various exemplary embodiments will be described in detail below with reference to the drawings.

A first exemplary embodiment will be described below with reference to the accompanying drawings.

Figure 1:
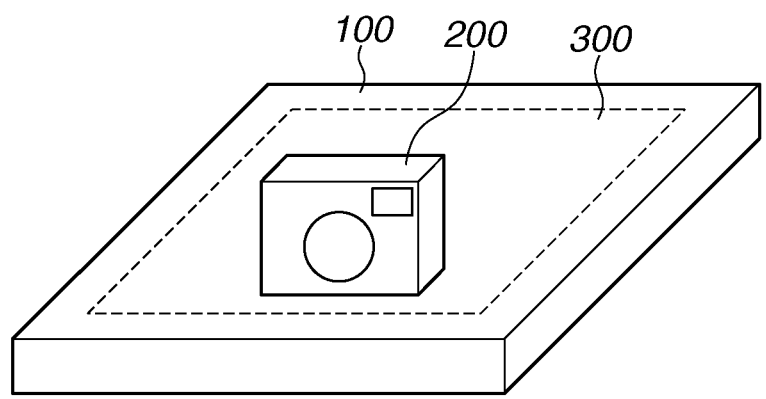
FIG. 1 illustrates an example of a wireless power supply system according to a first exemplary embodiment.

As illustrated in FIG. 1, a power supply system according to the first exemplary embodiment includes a power supply apparatus 100 and an electronic apparatus 200. In the power supply system according to the first exemplary embodiment, when the electronic apparatus 200 exists in a predetermined range 300 from the power supply apparatus 100, the power supply apparatus 100 wirelessly supplies the power to the electronic apparatus 200. When the electronic apparatus 200 exists in the predetermined range 300, the electronic apparatus 200 can wirelessly receive the power output from the power supply apparatus 100. On the other hand, when the electronic apparatus 200 does not exist in the predetermined range 300, the electronic apparatus 200 cannot receive the power from the power supply apparatus 100. The predetermined range 300 includes a range in which the power supply apparatus 100 can communicate with the electronic apparatus 200. Although the predetermined range 300 is a range on the housing of the power supply apparatus 100, the predetermined range 300 is not limited thereto. The power supply apparatus 100 may wirelessly supply the power to a plurality of electronic apparatuses.

The electronic apparatus 200 may be an imaging apparatus, a reproducing apparatus, or a communication apparatus, such as a mobile phone or a smart phone. Further, the electronic apparatus 200 may be a battery pack including a battery, an automobile, a display, or a personal computer.

Figure 2:
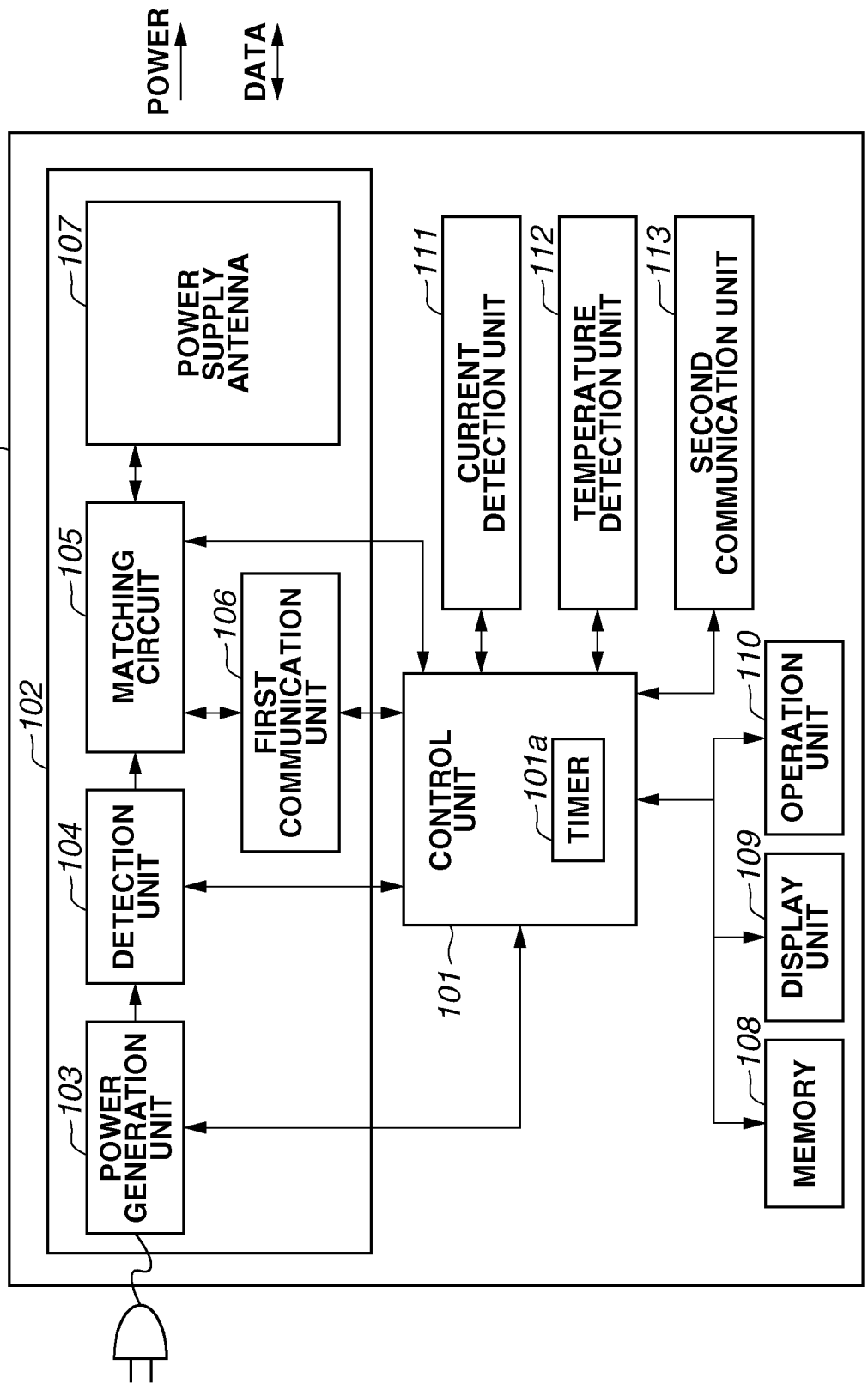
FIG. 2 is a block diagram illustrating an example of a power supply apparatus according to the first exemplary embodiment.

An example of a configuration of the power supply apparatus 100 according to the first exemplary embodiment will be described below with reference to FIG. 2. As illustrated in FIG. 2, the power supply apparatus 100 includes a control unit 101, a power supply unit 102, a memory 108, a display unit 109, an operation unit 110, a current detection unit 111, a temperature detection unit 112, and a second communication unit 113. The power supply unit 102 includes a power generation unit 103, a detection unit 104, a matching circuit 105, a first communication unit 106, and a power supply antenna 107.

The control unit 101 controls the power supply apparatus 100 by executing a computer program recorded in the memory 108. The control unit 101 includes, for example, a central processing unit (CPU) and a micro processing unit (MPU). The control unit 101 may be configured by hardware. The control unit 101 further includes a timer 101a.

The power supply unit 102 is used to wirelessly supply the power based on a predetermined power supply method. The predetermined power supply method is a power supply method using, for example, the magnetic resonance method. With the magnetic resonance method, the power supply apparatus 100 transmits the power to the electronic apparatus 200 in a state where the resonance occurs between the power supply apparatus 100 and the electronic apparatus 200. The state where the resonance occurs between the power supply apparatus 100 and the electronic apparatus 200 is a state where the resonance frequency of the power supply antenna 107 of the power supply apparatus 100 coincides with the resonance frequency of the power receiving antenna 203 of the electronic apparatus 200.

When an alternating current (AC) power source (not illustrated) is connected to the power supply apparatus 100, the power generation unit 103 generates the power to be output to the outside via the power supply antenna 107 by using the power supplied from the AC power source (not illustrated). The power generation unit 103 includes an element for adjusting the value of the power generated by the power generation unit 103, such as a field effect transistor (FET). By controlling the voltage of the FET included in the power generation unit 103, the control unit 101 can change the value of the power generated by the power generation unit 103.

The power generated by the power generation unit 103 is supplied to the power supply antenna 107 via the detection unit 104 and the matching circuit 105.

The detection unit 104 detects the voltage standing wave ratio (VSWR) to detect the state of the resonance between the power supply apparatus 100 and the electronic apparatus 200. The detection unit 104 further supplies data indicating the detected VSWR to the control unit 101. The VSWR value indicates the relation between the traveling wave of the power output from the power supply antenna 107 and the reflected wave of the power output from the power supply antenna 107. The control unit 101 can detect a change in the state of the resonance between the power supply apparatus 100 and the electronic apparatus 200, and detect the existence of a foreign object by using the VSWR data supplied from the detection unit 104. A foreign object is, for example, a metal or an integrated circuit (IC) card. A foreign object may be an apparatus not having a charging unit for controlling charging of a battery, an apparatus not having a communication unit for communicating with the power supply apparatus 100, or an apparatus not conforming to the communication standard for the first communication unit 106.

The matching circuit 105 includes a circuit for setting the resonance frequency of the power supply antenna 107, and a circuit for performing impedance matching between the power generation unit 103 and the power supply antenna 107.

When the power supply apparatus 100 outputs either one of the communication power and the predetermined power via the power supply antenna 107, the control unit 101 controls the matching circuit 105 to set the resonance frequency of the power supply antenna 107 to a predetermined frequency f. The predetermined frequency f is, for example, 13.56 MHz.

The first communication unit 106 performs wireless communication, for example, based on the Near Field Communication (NFC) Standard specified by the NFC Forum. The communication standard for the first communication unit 106 may be the International Organization for Standardization/International Electrotechnical Commission (ISO/IEC) 18092 standard, the ISO/IEC 14443 standard, or the ISO/IEC 21481 standard. When the communication power is being output from the power supply antenna 107, the first communication unit 106 can exchange data for wirelessly supplying power to the electronic apparatus 200 between the power supply apparatus 100 and the electronic apparatus 200 via the power supply antenna 107. However, when the predetermined power is being output from the power supply antenna 107, the first communication unit 106 does not communicate with the electronic apparatus 200 via the power supply antenna 107. The time period during which the predetermined power is being output from the power supply antenna 107 is hereinafter referred to as "predetermined time period". The predetermined time period is set by the control unit 101, for example, based on data received from the electronic apparatus 200.

Data exchanged between the first communication unit 106 and the electronic apparatus 200 conforms to the NFC Data Exchange Format (NDEF). Hereinafter, data conforming to the NDEF is referred to as "NDEF data".

The first communication unit 106 can transmit NDEF data to the electronic apparatus 200 by performing processing for superposing data to be transmitted to the electronic apparatus 200 on the communication power supplied from the power generation unit 103. The communication power having the data superposed thereon is transmitted to the electronic apparatus 200 via the power supply antenna 107.

The first communication unit 106 can detect current flowing in the power supply antenna 107, and receive the NDEF data from the electronic apparatus 200 based on the result of the current detection. This is because the electronic apparatus 200 transmits the NDEF data to the power supply apparatus 100 by changing the internal load of the electronic apparatus 200. The current flowing in the power supply antenna 107 changes when the internal load of the electronic apparatus 200 changes. Therefore, the first communication unit 106 can receive the NDEF data from the electronic apparatus 200 by detecting the current flowing in the power supply antenna 107.

The first communication unit 106 operates as a reader writer specified by the NFC Standard.

The power supply antenna 107 is an antenna for outputting either one of communication power and predetermined power to the electronic apparatus 200. The power supply antenna 107 is used by the first communication unit 106 to perform, using NFC Standard, wireless communication with the electronic apparatus 200.

The memory 108 stores a computer program for controlling the power supply apparatus 100. The memory 108 further stores power supply parameters related to the power supply apparatus 100, and flags for controlling the power supply. The memory 108 stores power supply capability data 108a. The power supply capability data 108a includes data indicating Power Level of the power supply supported by the power supply apparatus 100. The power supply capability data 108a according to the first exemplary embodiment includes, for example, any one of data indicating Low Power, data indicating Middle Power, and data indicating High Power. The data indicating Low Power included in the power supply capability data 108a indicates that, for example, the power supply apparatus 100 is capable of outputting the power of 1 W or below via the power supply antenna 107. The data indicating Middle Power included in the power supply capability data 108a indicates that, for example, the power supply apparatus 100 is capable of outputting the power of 5 W or below via the power supply antenna 107. The data indicating High Power included in the power supply capability data 108a indicates that, for example, the power supply apparatus 100 is capable of outputting the power of 10 W or below via the power supply antenna 107.

The memory 108 further stores data acquired from the electronic apparatus 200 by at least one of the first communication unit 106 and the second communication unit 113.

The display unit 109 displays video data supplied from the memory 108 and the second communication unit 113.

The operation unit 110 provides a user interface for operating the power supply apparatus 100. The operation unit 110 includes buttons, switches, and a touch panel for operating the power supply apparatus 100. The control unit 101 controls the power supply apparatus 100 according to an input signal input via the operation unit 110.

The current detection unit 111 detects current flowing in the power supply antenna 107, and supplies data indicating the detected current to the control unit 101. The control unit 101 can determine whether a foreign object exists in the predetermined range 300 by using the current data supplied from the current detection unit 111.

The temperature detection unit 112 detects the temperature of the power supply apparatus 100, and supplies data indicating the detected temperature to the control unit 101. The control unit 101 can determine whether a foreign object exists in the predetermined range 300 by using the temperature data supplied from the temperature detection unit 112. The temperature of the power supply apparatus 100 detected by the temperature detection unit 112 may be the internal temperature of the power supply apparatus 100 or the surface temperature of the power supply apparatus 100.

The second communication unit 113 wirelessly communicates with the electronic apparatus 200 based on a communication standard different from the communication standard for the first communication unit 106. The communication standard for the second communication unit 113 is, for example, the wireless local area network (LAN) standard or the Bluetooth (registered trademark) standard. The second communication unit 113 can exchange data including at least one of video data, sound data, and a command between the power supply apparatus 100 and the electronic apparatus 200.

The power supply apparatus 100 wirelessly supplies the power to the electronic apparatus 200. However, the word "wireless" may be expressed as "non-contact" or "no contact".

Figure 3:
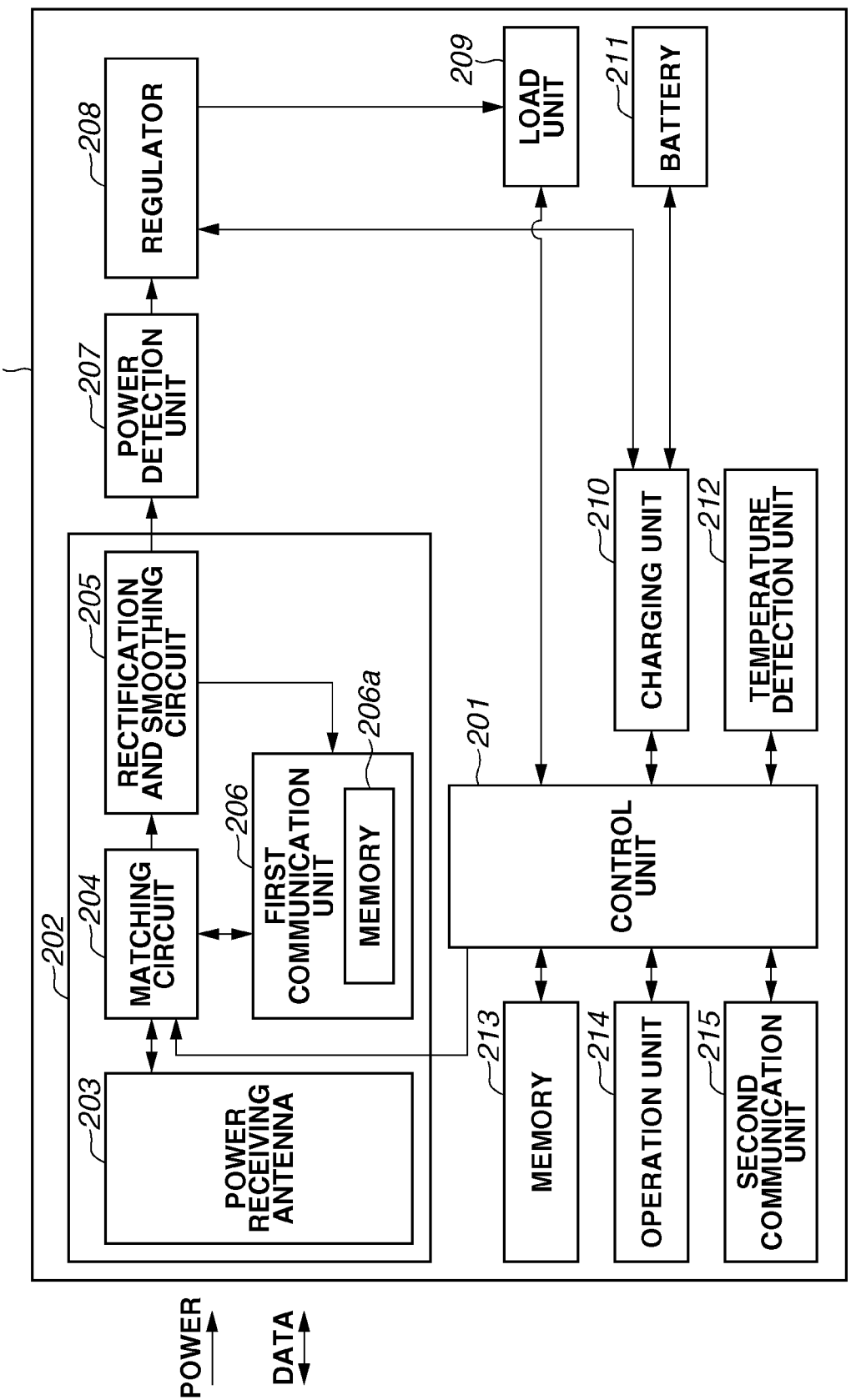
FIG. 3 is a block diagram illustrating an example of an electronic apparatus according to the first exemplary embodiment.

An example of a configuration of the electronic apparatus 200 will be described below with reference to FIG. 3. The electronic apparatus 200 includes a control unit 201, a power receiving unit 202, a power detection unit 207, a regulator 208, a load unit 209, a charging unit 210, a battery 211, a temperature detection unit 212, a memory 213, an operation unit 214, and a second communication unit 215. The power receiving unit 202 includes a power receiving antenna 203, a matching circuit 204, a rectification and smoothing circuit 205, and a first communication unit 206.

The control unit 201 controls the electronic apparatus 200 by executing a computer program recorded in the memory 213. The control unit 201 includes, for example, a CPU and an MPU. The control unit 201 may be configured by hardware.

The power receiving unit 202 supports the predetermined power supply method, and is used to wirelessly receive the power from the power supply apparatus 100.

The power receiving antenna 203 is an antenna for receiving the power supplied from the power supply apparatus 100. The power receiving antenna 203 is further used by the first communication unit 206 to perform, using NFC Standard, wireless communication with the power supply apparatus 100. The power received by the electronic apparatus 200 from the power supply apparatus 100 via the power receiving antenna 203 is supplied to the rectification and smoothing circuit 205 via the matching circuit 204.

The matching circuit 204 includes a circuit for setting a resonance frequency of the power receiving antenna 203. The control unit 201 can set the resonance frequency of the power receiving antenna 203 by controlling the matching circuit 204.

The rectification and smoothing circuit 205 generates direct current (DC) power based on the power received by the power receiving antenna 203. The rectification and smoothing circuit 205 further supplies the generated DC power to the regulator 208 via the power detection unit 207. When the power received by the power receiving antenna 203 includes data superposed thereon, the rectification and smoothing circuit 205 supplies data extracted from the power received by the power receiving antenna 203, to the first communication unit 206.

The first communication unit 206 communicates with the power supply apparatus 100 based on the same communication standard as the first communication unit 106. The first communication unit 206 has a predetermined tag called "active tag" or "dynamic tag".

The first communication unit 206 includes a memory 206a. The memory 206a stores Wireless Power Transfer_Record Type Definition (WPT_RTD) data 400. The WPT_RTD data 400 stores a plurality of NDEF data. The WPT_RTD data 400 stores data required to perform the wireless power supply between the power supply apparatus 100 and the electronic apparatus 200.

Figure 4:
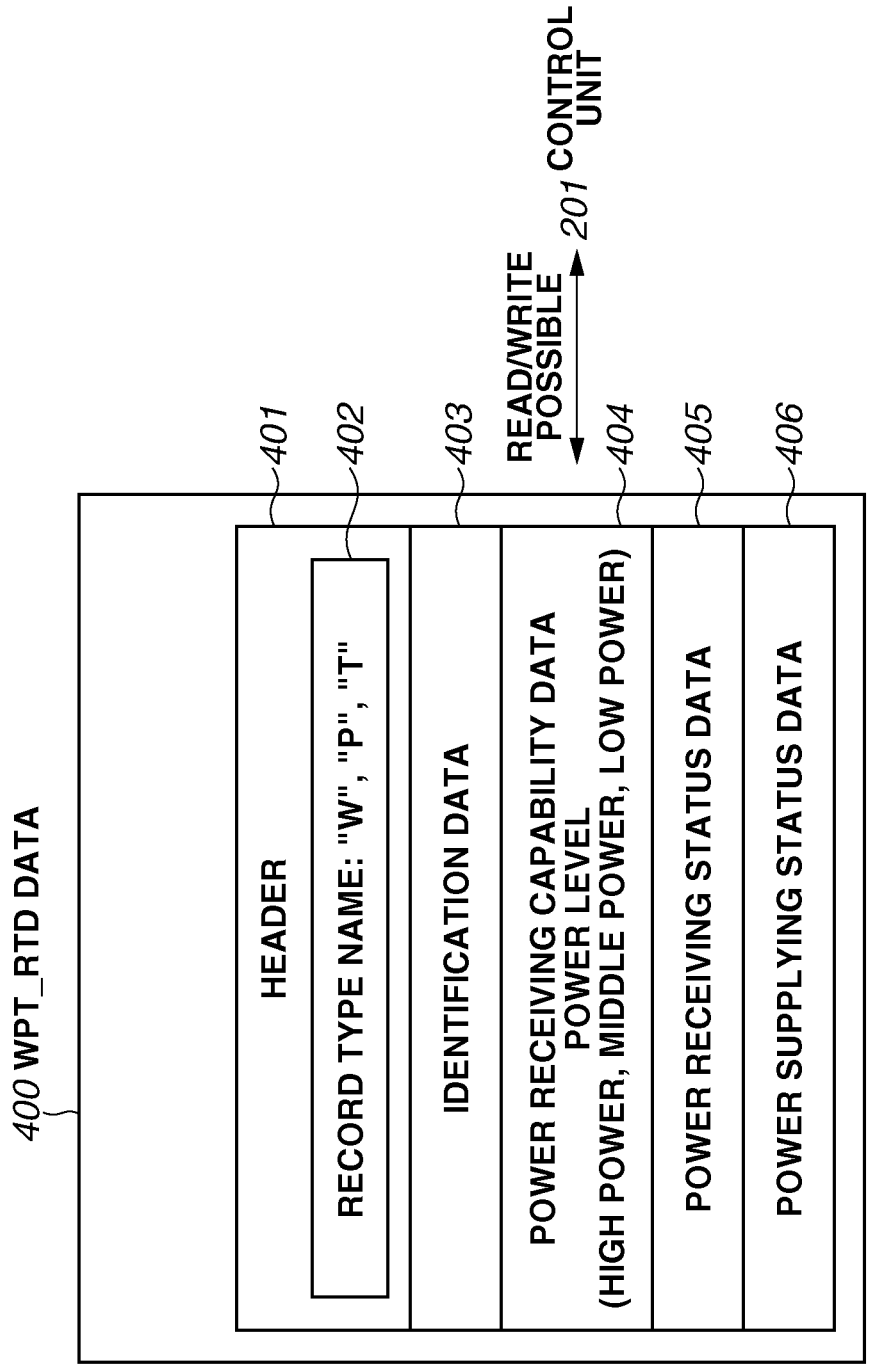
FIG. 4 illustrates an example of WPT_RTD data according to the first exemplary embodiment.

The WPT_RTD data 400 according to the first exemplary embodiment will be described below with reference to FIG. 4. When the electronic apparatus 200 has a predetermined tag, the control unit 201 can read data stored in the WPT_RTD data 400 illustrated in FIG. 4 via an internal bus interface (not illustrated). Further, when the electronic apparatus 200 has a predetermined tag, the control unit 201 can write data to the WPT_RTD data 400 illustrated in FIG. 4 via the internal bus interface (not illustrated).

The WPT_RTD data 400 includes a header 401, identification data 403, power receiving capability data 404, power receiving status data 405, and power supplying status data 406.

The header 401 stores a Record Type Name 402 for identifying the WPT_RTD data 400. The header 401 further includes data indicating whether the electronic apparatus 200 has a predetermined tag.

The Record Type Name 402 indicates the record type for identifying the contents and structure of the data stored in the WPT_RTD data 400. The Record Type Name 402 indicates that the electronic apparatus 200 supports the wireless power supply by using the predetermined power supply method. The Record Type Name 402 according to the first exemplary embodiment includes, for example, character string data "W", "P", and "T" which indicate that the electronic apparatus 200 supports the wireless power supply by using the predetermined power supply method.

The header 401 further includes data indicating the beginning of the NDEF data included in the WPT_RTD data 400, and data indicating the end of the NDEF data included in the WPT_RTD data 400.

The identification data 403 stores data indicating the Product ID, the manufacturer name, etc. of the electronic apparatus 200.

The power receiving capability data 404 pre-stores data indicating Power Level of the power reception supported by the electronic apparatus 200. The power receiving capability data 404 according to the first exemplary embodiment includes, for example, any one of the data indicating Low Power, the data indicating Middle Power, and the data indicating High Power. The data indicating Low Power included in the power receiving capability data 404 indicates, for example, that the electronic apparatus 200 is capable of receiving the power of 1 W or below via the power receiving antenna 203. The data indicating Middle Power included in the power receiving capability data 404 indicates, for example, that the electronic apparatus 200 is capable of receiving the power of 5 W or below via the power receiving antenna 203. The data indicating High Power included in the power receiving capability data 404 indicates, for example, that the electronic apparatus 200 is capable of receiving the power of 10 W or below via the power receiving antenna 203.

The power receiving status data 405 includes data indicating the status of the electronic apparatus 200. For example, the power receiving status data 405 includes the value of the requested power requested from the electronic apparatus 200 to the power supply apparatus 100, the value of the power received by the electronic apparatus 200 from the power supply apparatus 100, data related to the remaining capacity of the battery 211 and charging of the battery 211, and error data related to an error of the electronic apparatus 200. The error data includes data indicating whether an error occurred on the electronic apparatus 200, and data indicating the type of the error.

When the electronic apparatus 200 has a predetermined tag, the control unit 201 periodically detects the power receiving status data 405 by using data supplied from each unit of the electronic apparatus 200, and writes the detected power receiving status data 405 to the WPT_RTD data 400.

The power supplying status data 406 includes data indicating the status of the power supply apparatus 100. For example, the power supplying status data 406 includes the identification data for the power supply apparatus 100, data indicating whether the power supply apparatus 100 starts the transmission of the predetermined power to the electronic apparatus 200, and the power supply parameters set by the power supply apparatus 100.

When the electronic apparatus 200 has a predetermined tag, the control unit 201 controls each unit of the electronic apparatus 200 by using the power supplying status data 406 read from the WPT_RTD data 400.

The power detection unit 207 detects the power received via the power receiving antenna 203, and supplies data indicating the detected power to the control unit 201.

In response to an instruction from the control unit 201, the regulator 208 supplies at least one of the power supplied from the rectification and smoothing circuit 205 and the power supplied from the battery 211 to each unit of the electronic apparatus 200.

The load unit 209 includes an imaging circuit for generating video data, such as still images and moving images, based on optical images of the subject, and a reproduction circuit for reproducing video data.

The charging unit 210 charges the battery 211. In response to an instruction from the control unit 201, the charging unit 210 controls whether the battery 211 is to be charged by using the power supplied from the regulator 208, or the power discharged from the battery 211 is to be supplied to the regulator 208. The charging unit 210 periodically detects the remaining capacity of the battery 211, and supplies data indicating the remaining capacity of the battery 211 and data related to charging of the battery 211 to the control unit 201.

The battery 211 is connectable to the electronic apparatus 200. The battery 211 is a rechargeable secondary battery, such as a lithium ion battery. The battery 211 may be other than a lithium ion battery.

The temperature detection unit 212 detects the temperature of the electronic apparatus 200, and supplies data indicating the detected temperature to the control unit 201.

The memory 213 stores a computer program for controlling the electronic apparatus 200, and data including parameters related to the electronic apparatus 200.

The operation unit 214 provides a user interface for operating the electronic apparatus 200. The control unit 201 controls the electronic apparatus 200 according to an input signal input via the operation unit 214.

The second communication unit 215 wirelessly communicates with the power supply apparatus 100. The second communication unit 215 wirelessly communicates with the power supply apparatus 100, for example, based on the same communication standard as the second communication unit 113.

<Control Process>

Figure 5:
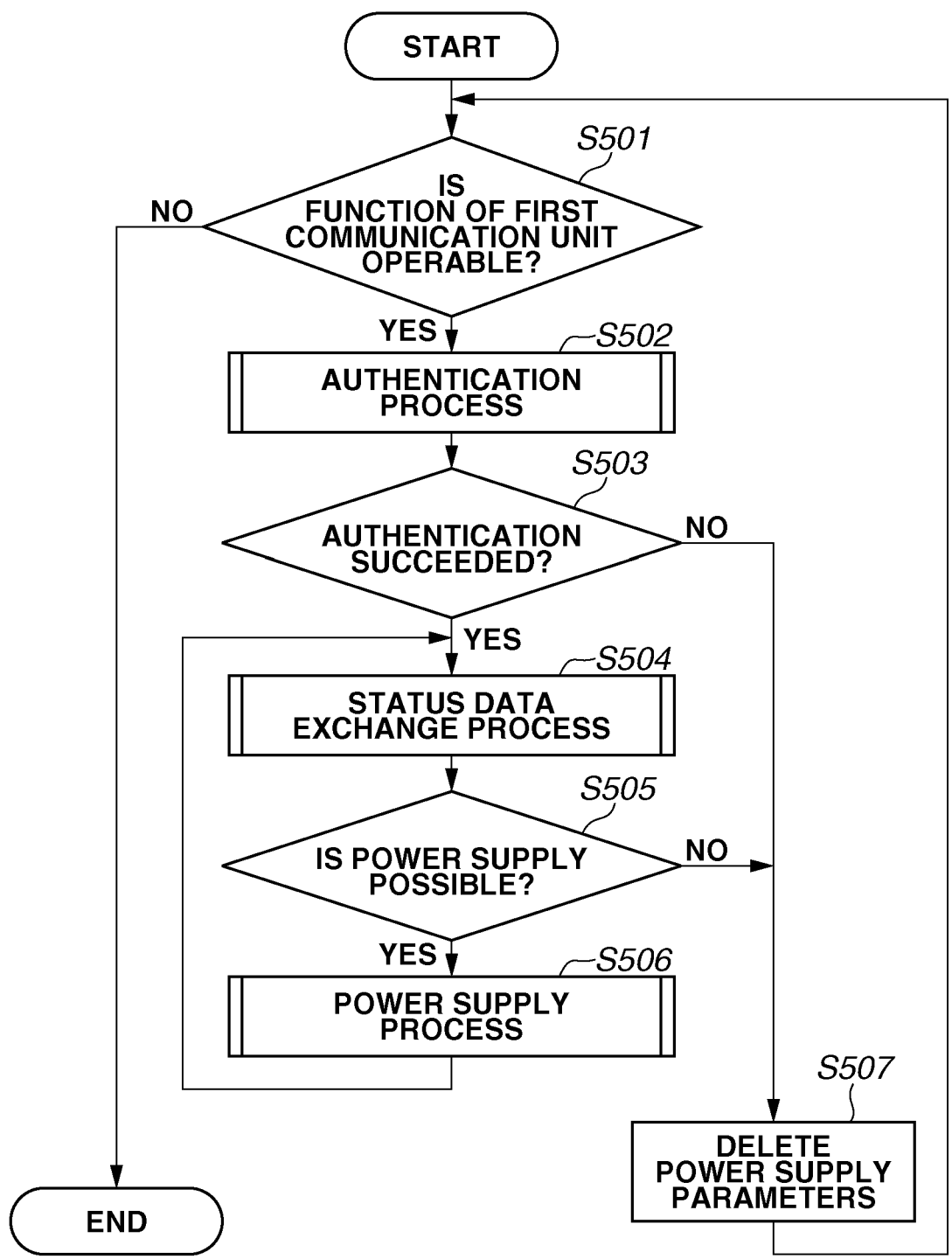
FIG. 5 is a flowchart illustrating an example of control process performed by the power supply apparatus according to the first exemplary embodiment.

A control process for controlling the wireless power supply by the power supply apparatus 100 according to the first exemplary embodiment will be described below with reference to the flowchart illustrated in FIG. 5. The control process is implemented when the control unit 101 executes a computer program stored in the memory 108.

In step S501, the control unit 101 determines whether the function of the first communication unit 106 of the power supply apparatus 100 is operable. When the function of the first communication unit 106 of the power supply apparatus 100 is determined to be operable (YES in step S501), the processing proceeds to step S502. On the other hand, when the function of the first communication unit 106 of the power supply apparatus 100 is determined to be not operable (NO in step S501), this flowchart ends.

In step S502, the control unit 101 performs authentication process described below. Upon completion of the authentication process, the processing proceeds to step S503.

In step S503, the control unit 101 determines whether an authentication for the wireless power supply between the power supply apparatus 100 and the electronic apparatus 200 is successfully completed. Upon completion of the authentication process in step S502, either one of an authentication success flag and an authentication failure flag is set to the memory 108. When the authentication success flag is set to the memory 108, the control unit 101 determines that the authentication for the wireless power supply is successfully completed (YES in step S503), and the processing proceeds to step S504. On the other hand, when the authentication failure flag is set to the memory 108, the control unit 101 determines that the authentication for the wireless power supply failed (NO in step S503), and the processing proceeds to step S507.

In step S504, the control unit 101 performs status data exchange process (described below). Upon completion of the status data exchange process in step S504, the processing proceeds to step S505.

In step S505, the control unit 101 determines whether the power supply apparatus 100 can supply the power to the electronic apparatus 200. Upon completion of the status data exchange process in step S504, either one of a power supply enable flag and a power supply disable flag is set to the memory 108. When the power supply enable flag is set to the memory 108, the control unit 101 determines that the power supply apparatus 100 can supply the power to the electronic apparatus 200 (YES in step S505), and the processing proceeds to step S506. On the other hand, when the power supply disable flag is set to the memory 108, the control unit 101 determines that the power supply apparatus 100 cannot supply the power to the electronic apparatus 200 (NO in step S505), and the processing proceeds to step S507.

In step S506, the control unit 101 performs power supply process (described below). Upon completion of the power supply process in step S506, the processing proceeds to step S504.

In step S507, the control unit 101 deletes the power supply parameters and flags related to power supply control stored in the memory 108. Then, the processing returns to step S501.

<Authentication Process>

Authentication process performed by the control unit 101 in step S502 in FIG. 5 according to the first exemplary embodiment will be described below with reference to a flowchart illustrated in FIG. 6. The authentication process is implemented when the control unit 101 executes a computer program stored in the memory 108.

In step S601, the control unit 101 controls the power supply unit 102 to output communication power. The control unit 101 performs control so that the communication power is output via the power supply antenna 107 until the control unit 101 starts the process for outputting the predetermined power. Then, the processing proceeds to step S602.

In step S602, the control unit 101 controls the first communication unit 106 to transmit data for requesting the Record Type Name 402 to check whether the electronic apparatus 200 has the WPT_RTD data 400. Then, the processing proceeds to step S603.

In step S603, the control unit 101 determines whether the electronic apparatus 200 has the WPT_RTD data 400 by using the Record Type Name 402 acquired from the electronic apparatus 200 by the first communication unit 106. When the electronic apparatus 200 is determined to have the WPT_RTD data 400 (YES in step S603), the processing proceeds to step S604. On the other hand, when the electronic apparatus 200 is determined not to have the WPT_RTD data 400 (NO in step S603), the processing returns to step S602. When the first communication unit 106 has not acquired the Record Type Name 402 from the electronic apparatus 200, the processing also returns to step S602.

In step S604, the control unit 101 controls the first communication unit 106 to transmit data for requesting data included in the header 401, identification data 403, and the power receiving capability data 404. The control unit 101 further analyzes data acquired from the electronic apparatus 200 by the first communication unit 106, and stores the result of the analysis in the memory 108. Then, the processing proceeds to step S605.

In step S605, the control unit 101 determines, based on the result of the analysis in step S604, whether a communication error has occurred in the data included in the header 401, the identification data 403, and the power receiving capability data 404 acquired from the electronic apparatus 200. When a communication error has occurred in the data included in the header 401, the identification data 403, and the power receiving capability data 404 acquired from the electronic apparatus 200 (YES in step S605), the processing proceeds to step S606. On the other hand, when a communication error has not occurred in the data included in the header 401, the identification data 403, and the power receiving capability data 404 acquired from the electronic apparatus 200 (NO in step S605), the processing proceeds to step S608.

In step S606, the control unit 101 causes the display unit 109 to display data indicating that an error of the communication between the power supply apparatus 100 and the electronic apparatus 200 has been detected. Then, the processing proceeds to step S607.

In step S607, the control unit 101 sets the authentication failure flag in the memory 108. Then, this flowchart is ended and the processing proceeds to step S503 in FIG. 5.

If a foreign object is placed in the predetermined range 300, the power supply apparatus 100 detects the foreign object. In this case, the power supply apparatus 100 needs to restrict the power supply to the electronic apparatus 200. Then, the power supply apparatus 100 performs the process in step S608 to determine whether a foreign object exists in the predetermined range 300.

In step S608, the control unit 101 determines whether a foreign object exists in the predetermined range 300.

When a foreign object is placed in the predetermined range 300, the VSWR detected by the detection unit 104 may rapidly change. Then, for example, the control unit 101 detects the foreign object by determining whether the VSWR detected by the detection unit 104 has changed by a predetermined value or more. The predetermined value is a threshold value for identifying the existence of a foreign object. When the VSWR detected by the detection unit 104 has changed by the predetermined value or more (YES in step S608), the control unit 101 determines that a foreign object exists in the predetermined range 300. On the other hand, when the VSWR detected by the detection unit 104 has not changed by the predetermined value or more (NO in step S608), the control unit 101 determines that a foreign object does not exist in the predetermined range 300.

When a foreign object is placed in the predetermined range 300, the current detected by the current detection unit 111 may rapidly increase. For example, the control unit 101 detects the foreign object by determining whether the current value detected by the current detection unit 111 is equal to or larger than a predetermined current value. The predetermined current value is a threshold value for identifying the existence of a foreign object.

When the current value detected by the current detection unit 111 is equal to or larger than the predetermined current value (YES in step S608), the control unit 101 determines that a foreign object exists in the predetermined range 300. On the other hand, when the current value detected by the current detection unit 111 is smaller than the predetermined current value (NO in step S608), the control unit 101 determines that a foreign object does not exist in the predetermined range 300.

When a foreign object is placed in the predetermined range 300, the temperature detected by the temperature detection unit 112 may rapidly rise. For example, the control unit 101 detects the foreign object by determining whether the temperature detected by the temperature detection unit 112 is equal to or higher than a predetermined temperature.

The predetermined temperature is a threshold value for identifying the existence of a foreign object.

When the temperature detected by the temperature detection unit 112 is equal to or higher than the predetermined temperature (YES in step S608), the control unit 101 determines that a foreign object exists in the predetermined range 300. On the other hand, when the temperature detected by the temperature detection unit 112 is lower than the predetermined temperature (NO in step S608), the control unit 101 determines that a foreign object does not exist in the predetermined range 300. When a foreign object is determined to exist in the predetermined range 300 (YES in step S608), the processing proceeds to step S609. On the other hand, when a foreign object is determined not to exist in the predetermined range 300 (NO in step S608), the processing proceeds to step S610.

In step S609, the control unit 101 causes the display unit 109 to display data for notifying that a foreign object has been detected. Then, the processing proceeds to step S607.

In step S610, the control unit 101 determines whether the electronic apparatus 200 is compatible with the power supply apparatus 100 by using the Record Type Name 402 acquired from the electronic apparatus 200.

For example, when the power supply method employed by the power supply apparatus 100 coincides with the power supply method employed by the electronic apparatus 200, the control unit 101 determines that the electronic apparatus 200 is compatible with the power supply apparatus 100. On the other hand, when the power supply method employed by the power supply apparatus 100 does not coincide with the power supply method employed by the electronic apparatus 200, the control unit 101 determines that the electronic apparatus 200 is not compatible with the power supply apparatus 100.

When the electronic apparatus 200 is determined to be not compatible with the power supply apparatus 100 (NO in step S610), the processing proceeds to step S611. On the other hand, when the electronic apparatus 200 is determined to be compatible with the power supply apparatus 100 (YES in step S610), the processing proceeds to step S612.

In step S611, the control unit 101 causes the display unit 109 to display data indicating that an authentication error between the power supply apparatus 100 and the electronic apparatus 200 has been detected. Then, the processing proceeds to step S607.

In step S612, the control unit 101 determines whether the electronic apparatus 200 has a predetermined tag by using the data included in the header 401 acquired from the electronic apparatus 200 by the first communication unit 106 in step S604. When the electronic apparatus 200 has a predetermined tag (YES in step S612), the processing proceeds to step S613. On the other hand, when the electronic apparatus 200 does not have a predetermined tag (NO in step S612), the processing proceeds to step S611.

In step S613, the control unit 101 sets the authentication success flag in the memory 108. Then, this flowchart is ended and the processing proceeds to step S503 in FIG. 5.

<Status Data Exchange Process>

Figure 7:
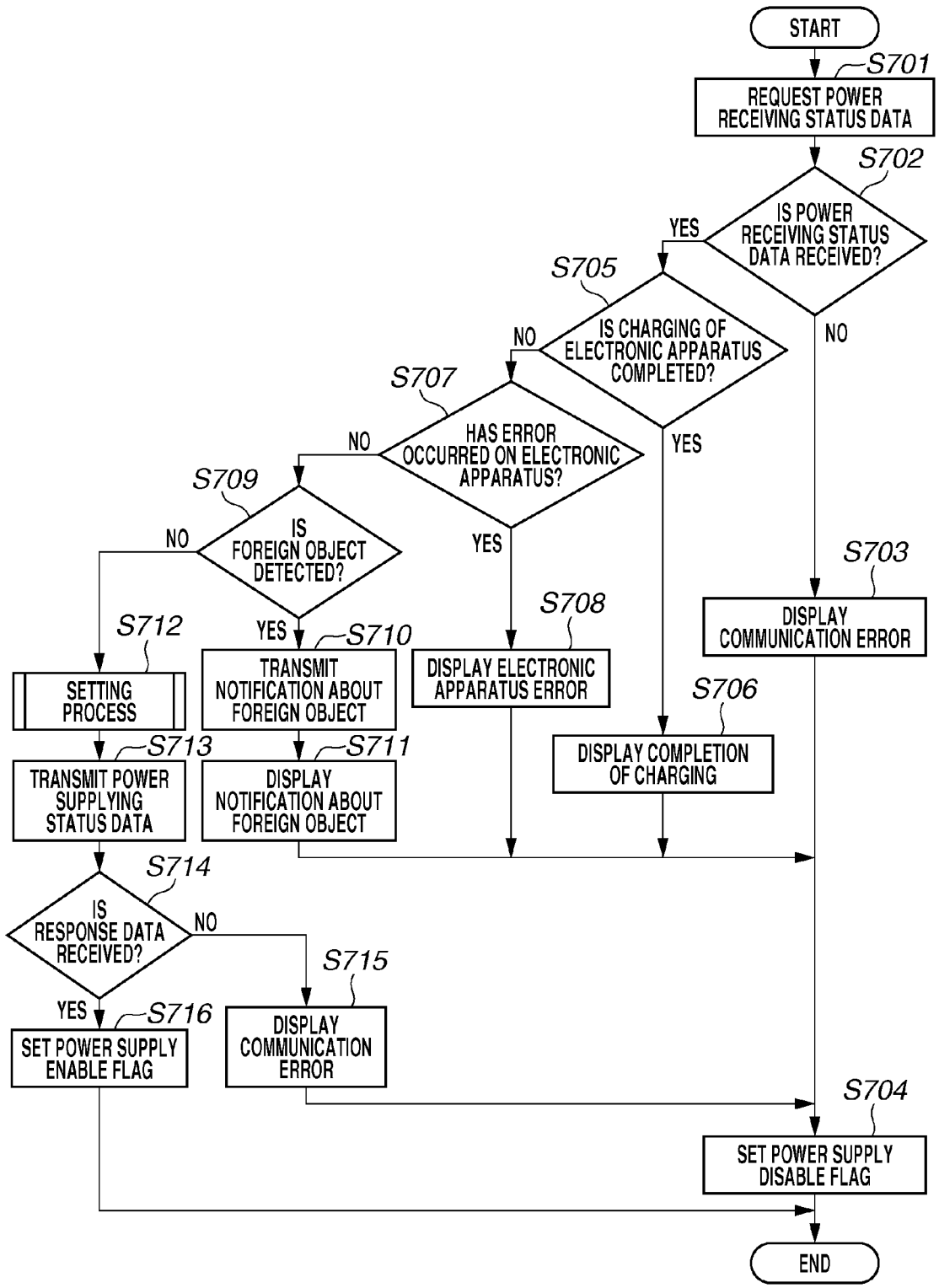
FIG. 7 is a flowchart illustrating an example of status data exchange process performed by the power supply apparatus according to the first exemplary embodiment.

The status data exchange process performed by the control unit 101 in step S504 in FIG. 5 according to the first exemplary embodiment will be described below with reference to a flowchart illustrated in FIG. 7. The status data exchange process is implemented when the control unit 101 executes a relevant computer program stored in the memory 108.

In step S701, the control unit 101 controls the first communication unit 106 to transmit data for requesting the power receiving status data 405 to the electronic apparatus 200. Then, the processing proceeds to step S702.

In step S702, the control unit 101 determines whether the first communication unit 106 has received the power receiving status data 405 from the electronic apparatus 200 before a predetermined time period has elapsed since the request for the power receiving status data 405 was transmitted to the electronic apparatus 200. When the control unit 101 determines that the first communication unit 106 has received the power receiving status data 405 from the electronic apparatus 200 (YES in step S702), the processing proceeds to step S705. On the other hand, when the control unit 101 determines that the first communication unit 106 has not received the power receiving status data 405 from the electronic apparatus 200 when the predetermined time period has elapsed since the request for the power receiving status data 405 was transmitted to the electronic apparatus 200 (NO in step S702), the processing proceeds to step S703.

In step S703, similar to step S606, the control unit 101 causes the display unit 109 to display data indicating that a communication error has been detected. Then, the processing proceeds to step S704.

In step S704, the control unit 101 sets the power supply disable flag in the memory 108. Then, this flowchart is ended and the processing proceeds to step S505 in FIG. 5.

In step S705, the control unit 101 determines, based on the power receiving status data 405 received by the first communication unit 106, whether charging of the electronic apparatus 200 is completed. When the control unit 101 determines that charging of the electronic apparatus 200 is completed (YES in step S705), the processing proceeds to step S706. On the other hand, when the control unit 101 determines that charging of the electronic apparatus 200 is not completed (NO in step S705), the processing proceeds to step S707.

In step S706, the control unit 101 causes the display unit 109 to display data indicating that charging of the electronic apparatus 200 is completed. The control unit 101 may cause the display unit 109 to display data indicating that the battery 211 is fully charged. Then, the processing proceeds to step S704.

In step S707, the control unit 101 determines, based on the power receiving status data 405 received by the first communication unit 106, whether an error has occurred on the electronic apparatus 200. For example, the control unit 101 detects error data from the power receiving status data 405 of the electronic apparatus 200, and analyzes the error data to determine whether an error has occurred on the electronic apparatus 200.

When the control unit 101 determines that an error has occurred on the electronic apparatus 200 (YES in step S707), the processing proceeds to step S708. On the other hand, when the control unit 101 determines that an error has not occurred on the electronic apparatus 200 (NO in step S707), the processing proceeds to step S709.

In step S708, the control unit 101 causes the display unit 109 to display data indicating that an error has occurred on the electronic apparatus 200. The control unit 101 may cause the display unit 109 to display data indicating the type of the error occurred on the electronic apparatus 200. Then, the processing proceeds to step S704.

In step S709, similar to step S608, the control unit 101 determines whether a foreign object exists in the predetermined range 300. When a foreign object is determined to exist in the predetermined range 300 (YES in step S709), the processing proceeds to step S710. On the other hand, when a foreign object is determined not to exist in the predetermined range 300 (NO in step S709), the processing proceeds to step S712.

In step S710, the control unit 101 controls the first communication unit 106 to transmit data for notifying the electronic apparatus 200 that a foreign object has been detected. Then, the processing proceeds to step S711.

In step S711, the control unit 101 causes the display unit 109 to display data for notifying that a foreign object has been detected. Then, the processing proceeds to step S704.

In step S712, the control unit 101 performs setting process (described below). The setting process is a process for setting the power supply parameters. The power supply parameters include the value indicating predetermined power and the value indicating predetermined time period. Upon completion of the setting process, the processing proceeds to step S713.

In step S713, the control unit 101 controls the first communication unit 106 to transmit the power supplying status data 406 to the electronic apparatus 200. The control unit 101 generates the power supplying status data 406 including the identification data for the power supply apparatus 100, the power supply parameters set in step S712, and data indicating that the transmission of the predetermined power to the electronic apparatus 200 is to be started. The control unit 101 further controls the first communication unit 106 to transmit the generated power supplying status data 406 to the electronic apparatus 200. Then, the processing proceeds to step S714.

When the power supplying status data 406 is stored in the WPT_RTD data 400, the first communication unit 206 transmits response data indicating that the power supplying status data 406 has been normally written to the WPT_RTD data 400, to the power supply apparatus 100.

In step S714, the control unit 101 determines whether the first communication unit 106 has received the response data from the electronic apparatus 200 before a predetermined time period has elapsed since the power supplying status data 406 was transmitted to the electronic apparatus 200. When the control unit 101 determines that the first communication unit 106 has received the response data from the electronic apparatus 200 (YES in step S714), the processing proceeds to step S716. On the other hand, when the control unit 101 determines that the first communication unit 106 has not received the response data from the electronic apparatus 200 when the predetermined time period has elapsed since the power supplying status data 406 was transmitted to the electronic apparatus 200 (NO in step S714), the processing proceeds to step S715. Also when the response data received from the electronic apparatus 200 by the first communication unit 106 indicates that the power supplying status data 406 has not been normally written to the WPT_RTD data 400, the processing proceeds to step S715.

In step S715, similar to step S606, the control unit 101 causes the display unit 109 to display data indicating that a communication error has been detected. Then, the processing proceeds to step S704.

In step S716, the control unit 101 sets the power supply enable flag in the memory 108. Then, this flowchart is ended and the processing proceeds to step S505 in FIG. 5.

<Power Supply Process>

Figure 8:
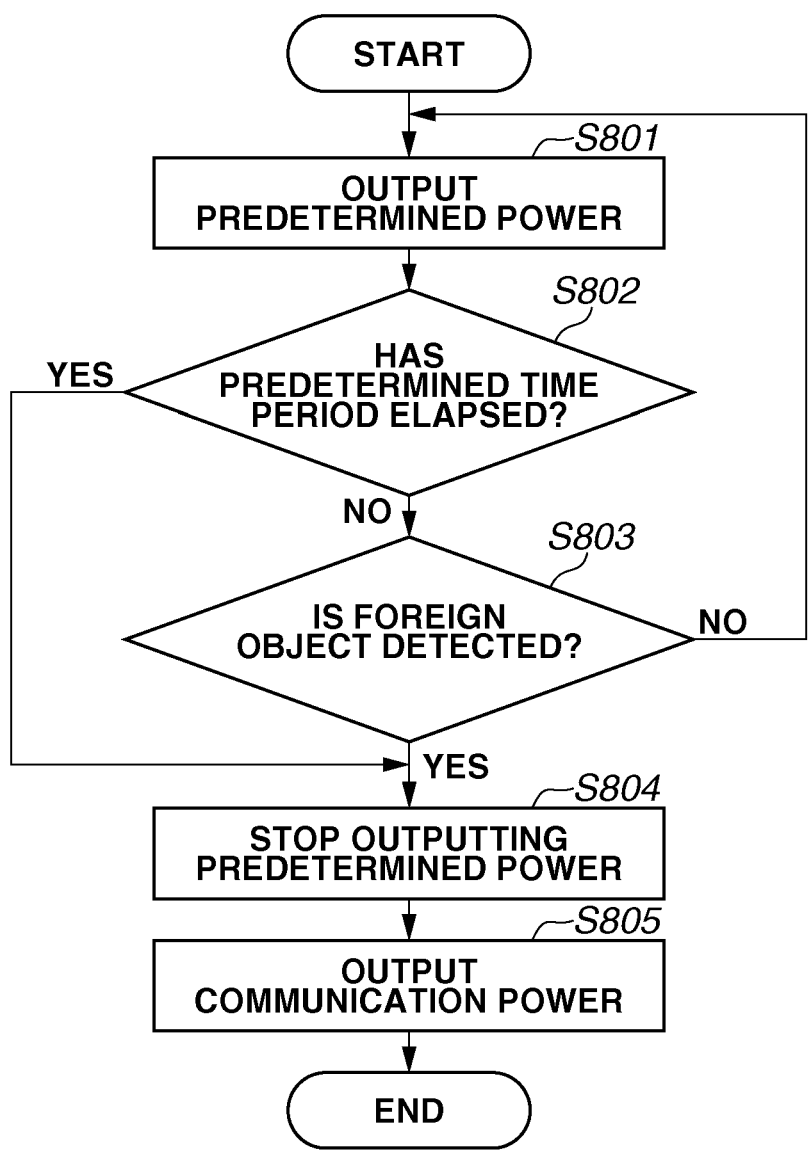
FIG. 8 is a flowchart illustrating an example of power supply process performed by the power supply apparatus according to the first exemplary embodiment.

The power supply process performed by the control unit 101 in step S506 in FIG. 5 according to the first exemplary embodiment will be described below with reference to a flowchart illustrated in FIG. 8. The power supply process is implemented when the control unit 101 executes a relevant computer program stored in the memory 108.

In step S801, based on the power supply parameters set in step S712, the control unit 101 controls the power supply unit 102 to output the predetermined power. The control unit 101 further controls the timer 101a to measure the time elapsed since the predetermined power has been output. Then, the processing proceeds to step S802.

In step S802, the control unit 101 determines, based on the elapsed time measured by the timer 101a, whether the predetermined time period has elapsed since the predetermined power was output. Note that "the predetermined time period" to be used in S802 is set in S712. When the time measured by the timer 101a is equal to or longer than the predetermined time period, the control unit 101 determines that the predetermined time period has elapsed since the predetermined power was output (YES in step S802), and the processing proceeds to step S804. On the other hand, when the time measured by the timer 101a is shorter than the predetermined time period, the control unit 101 determines that the predetermined time period has not elapsed since the predetermined power was output (NO in step S802), and the processing proceeds to step S803.

In step S803, similar to step S608, the control unit 101 determines whether a foreign object exists in the predetermined range 300. When a foreign object is determined to exist in the predetermined range 300 (YES in step S803), the processing proceeds to step S804. On the other hand, when a foreign object is determined not to exist in the predetermined range 300 (NO in step S803), the processing returns to step S801.

In step S804, the control unit 101 controls the power supply unit 102 to stop outputting the predetermined power. Then, the processing proceeds to step S805.

In step S805, the control unit 101 controls the power supply unit 102 to output the communication power. Then, this flowchart is ended and then the processing returns to step S504 in FIG. 5.

<Setting Process>

Figure 9:
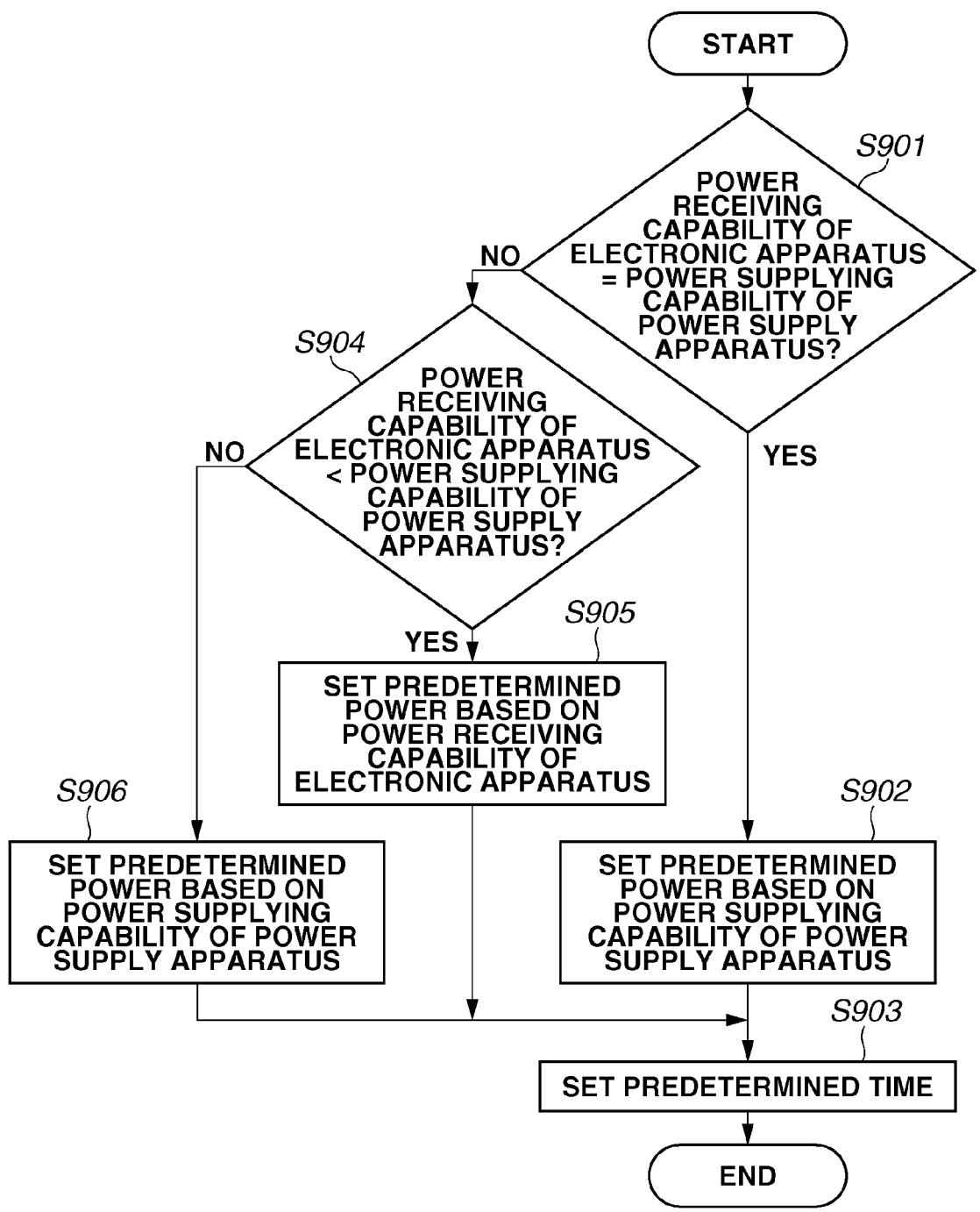
FIG. 9 is a flowchart illustrating exemplary setting process performed by the power supply apparatus according to the first exemplary.

The setting process performed by the control unit 101 in step S712 in FIG. 7 according to the first exemplary embodiment will be described below with reference to the flowchart illustrated in FIG. 9. The power supply process is implemented when the control unit 101 executes a computer program stored in the memory 108.

In step S901, the control unit 101 determines whether the power supply capability of the power supply apparatus 100 and the power receiving capability of the electronic apparatus 200 are compatible with each other.

For example, when the data indicating Low Power is included in the power supply capability data 108a and the data indicating Low Power is included in the power receiving capability data 404, the control unit 101 determines that the power supply capability of the power supply apparatus 100 and the power receiving capability of the electronic apparatus 200 are compatible with each other.

For example, when the data indicating Middle Power is included in the power supply capability data 108a and the data indicating Middle Power is included in the power receiving capability data 404, the control unit 101 determines that the power supply capability of the power supply apparatus 100 and the power receiving capability of the electronic apparatus 200 are compatible with each other. For example, when the data indicating High Power is included in the power supply capability data 108a and the data indicating High Power is included in the power receiving capability data 404, the control unit 101 determines that the power supply capability of the power supply apparatus 100 and the power receiving capability of the electronic apparatus 200 are compatible with each other.

However, for example, when the data indicating Low Power is included in the power supply capability data 108*a* and the data indicating Low Power is not included in the power receiving capability data 404, the control unit 101 determines that the power supply capability of the power supply apparatus 100 and the power receiving capability of the electronic apparatus 200 are not compatible with each other. For example, when the data indicating Middle Power is included in the power supply capability data 108*a* and the data indicating Middle Power is not included in the power receiving capability data 404, the control unit 101 determines that the power supply capability of the power supply apparatus 100 and the power receiving capability of the electronic apparatus 200 are not compatible with each other. For example, when the data indicating High Power is included in the power supply capability data 108*a* and the data indicating High Power is not included in the power receiving capability data 404, the control unit 101 determines that the power supply capability of the power supply apparatus 100 and the power receiving capability of the electronic apparatus 200 are not compatible with each other.

When the power supply capability of the power supply apparatus 100 and the power receiving capability of the electronic apparatus 200 are determined to coincide with each other (YES in step S901), the processing proceeds to step S902.

On the other hand, when the power supply capability of the power supply apparatus 100 and the power receiving capability of the electronic apparatus 200 are determined not to coincide with each other (NO in step S901), the processing proceeds to step S904.

In step S902, the control unit 101 sets predetermined power based on the power supply capability of the power supply apparatus 100.

For example, when the data indicating Low Power is included in the power supply capability data 108*a*, the control unit 101 sets the value of the predetermined power to 1 W or below. The control unit 101 may further set the value of the predetermined power so as not to exceed 1 W according to the efficiency of the power supply or the remaining capacity of the battery 211.

For example, when the data indicating Middle Power is included in the power supply capability data 108*a*, the control unit 101 sets the value of the predetermined power to 5 W or below. The control unit 101 may further set the value of the predetermined power so as not to exceed 5 W according to the efficiency of the power supply or the remaining capacity of the battery 211.

For example, when the data indicating High Power is included in the power supply capability data 108*a*, the control unit 101 sets the value of the predetermined power to 10 W or below. The control unit 101 may further set the value of the predetermined power so as not to exceed 10 W according to the efficiency of the power supply or the remaining capacity of the battery 211.

When the predetermined power has been set, the processing proceeds to step S903.

In step S903, the control unit 101 sets a predetermined time period according to the predetermined power set by the processing in any one of steps S902, S905, and S906.

For example, when the predetermined power is set to the power of 1 W or below, the control unit 101 sets the predetermined time period to 20 seconds. For example, when the predetermined power is set to a value higher than 1 W and equal to or smaller than 5 W, the control unit 101 sets the predetermined time period to 10 seconds. For example, when the predetermined power is set to a value larger than 5 W and equal to or smaller than 10 W, the control unit 101 sets the predetermined time period to 5 seconds.

In step S903, the control unit 101 sets a shorter predetermined time period for a larger value of the predetermined power.

The value of the predetermined power set by the processing in any one of steps S902, S905, and S906, and the predetermined time set by the processing in step S903 are recorded in the memory 108 as power supply parameters.

After the power supply parameters have been recorded in the memory 108, the processing proceeds to step S713.

In step S904, the control unit 101 compares the power supply capability of the power supply apparatus 100 with the power receiving capability of the electronic apparatus 200. For example, when the data indicating Middle Power is included in the power supply capability data 108*a*, and the data indicating Low Power is included in the power receiving capability data 404, the control unit 101 determines that the power supply capability of the power supply apparatus 100 is larger than the power receiving capability of the electronic apparatus 200. For example, when the data indicating High Power is included in the power supply capability data 108*a*, and the data indicating Middle Power is included in the power receiving capability data 404, the control unit 101 determines that the power supply capability of the power supply apparatus 100 is larger than the power receiving capability of the electronic apparatus 200. For example, when the data indicating High Power is included in the power supply capability data 108*a*, and the data indicating Low Power is included in the power receiving capability data 404, the control unit 101 determines that the power supply capability of the power supply apparatus 100 is larger than the power receiving capability of the electronic apparatus 200.

When the power supply capability of the power supply apparatus 100 is determined to be larger than the power receiving capability of the electronic apparatus 200 (YES in step S904), the processing proceeds to step S905. On the other hand, when the power supply capability of the power supply apparatus 100 is determined to be not larger than the power receiving capability of the electronic apparatus 200 (NO in step S904), the processing proceeds to step S906.

In step S905, the control unit 101 sets predetermined power based on the power receiving capability of the electronic apparatus 200.

For example, when the data indicating Low Power is included in the power receiving capability data 404, the control unit 101 sets the value of the predetermined power to 1 W or below. The control unit 101 may further set the value of the predetermined power so as not to exceed 1 W according to the efficiency of the power supply or the remaining capacity of the battery 211.

For example, when the data indicating Middle Power is included in the power receiving capability data 404, the control unit 101 sets the value of the predetermined power to 5 W or below. The control unit 101 may further set the value of the predetermined power so as not to exceed 5 W according to the efficiency of the power supply or the remaining capacity of the battery 211.

For example, when the data indicating High Power is included in the power receiving capability data 404, the control unit 101 sets the value of the predetermined power to 10 W or below. The control unit 101 may further set the value of the predetermined power so as not to exceed 10 W according to the efficiency of the power supply or the remaining capacity of the battery 211.

When the predetermined power has been set, the processing proceeds to step S903.

In step S906, similar to step S902, the control unit 101 sets the predetermined power based on the power supply capability of the power supply apparatus 100. When the predetermined power has been set, the processing proceeds to step S903.

Thus, the power supply apparatus 100 according to the first exemplary embodiment performs authentication for the wireless power supply between the power supply apparatus 100 and the electronic apparatus 200 through the communication with the electronic apparatus 200, and controls whether the power is to be wirelessly supplied to the electronic apparatus 200 based on the result of the authentication. Therefore, the power supply apparatus 100 wirelessly supplies power to the electronic apparatus 200 whose authentication for the wireless power supply has been successful, and the electronic apparatus 200 whose authentication for the wireless power supply has not been successful.

The power supply apparatus 100 further detects the status of the electronic apparatus 200 through the communication with the electronic apparatus 200, and controls, based on the detected status of the electronic apparatus 200, whether the power is to be wirelessly supplied to the electronic apparatus 200. Therefore, the power supply apparatus 100 can wirelessly supply power to the electronic apparatus 200 whose power receiving status can be detected, and the electronic apparatus 200 that cannot detect the power receiving status can be protected. The power supply apparatus 100 can wirelessly supply power to the electronic apparatus 200 on which an error has not occurred, and the electronic apparatus 200 on which an error has occurred can be protected. The power supply apparatus 100 can wirelessly supply power to the electronic apparatus 200 on which charging is not completed, and the electronic apparatus 200 on which charging is completed can be protected.

While the power supply apparatus 100 is supplying the predetermined power to the electronic apparatus 200, the power supply apparatus 100 determines whether an error related to charging or to power supply has occurred on the electronic apparatus 200 via at least one of the detection unit 104, the current detection unit 111, and the temperature detection unit 112. When the power supply apparatus 100 detects that an error related to charging or to power supply has occurred on the electronic apparatus 200 via at least one of the detection unit 104, the current detection unit 111, and the temperature detection unit 112, the power supply apparatus 100 stops outputting the predetermined power, and communicates with the electronic apparatus 200. Thus, power supply to the electronic apparatus 200 can be suitably controlled.

Further, the power supply apparatus 100 sets the predetermined power according to the power level of the power supply supported by the power supply apparatus 100 and the power level of the power reception supported by the electronic apparatus 200. Thus, the power supply apparatus 100 can prevent excessive power supply to the electronic apparatus 200. Further, the power supply apparatus 100 sets the duration of the predetermined time period according to the value of the predetermined power. Thus, the power supply apparatus 100 having a larger value of the predetermined power communicates with the electronic apparatus 200 at shorter interval, achieving the power supply suitable for the status of the electronic apparatus 200.

Therefore, the power supply apparatus 100 according to the first exemplary embodiment can wirelessly supply the power to the electronic apparatus 200 suitably through the communication between the power supply apparatus 100 and the electronic apparatus 200.

Configurations and processes according to a second exemplary embodiment different from those according to the first exemplary embodiment will be described below. Descriptions of similar configurations and processes to those of the first exemplary embodiment will be omitted.

In the first exemplary embodiment, the power supply capability data 108a includes any one of the data indicating Low Power, the data indicating Middle Power, and the data indicating High Power. Further, in the first exemplary embodiment, the power receiving capability data 404 includes any one of the data indicating Low Power, the data indicating Middle Power, and the data indicating High Power. However, in the second exemplary embodiment, the power supply capability data 108b, instead of the power supply capability data 108a, is stored in the memory 108, and the power receiving capability data 407, instead of the power receiving capability data 404, is stored in the WPT_RTD data 400.

In the second exemplary embodiment, the power supply capability data 108b stores data indicating the power level of the power supply supported by the power supply apparatus 100. For example, the power supply capability data 108b includes first data indicating the minimum value of the power (Min Power) which can be supplied by the power supply apparatus 100, and second data indicating the maximum value of the power (Max Power) which can be supplied by the power supply apparatus 100. The first data indicates, for example, the minimum value of the power which can be output by the power supply apparatus 100 via the power supply antenna 107. The second data indicates, for example, the maximum value of the power which can be output by the power supply apparatus 100 via the power supply antenna 107.

The power receiving capability data 407 according to the second exemplary embodiment will be described below with reference to FIG. 10. The power receiving capability data 407 stores data indicating the power level of the power reception supported by the electronic apparatus 200. For example, the power receiving capability data 407 includes third data indicating the minimum value of the power (Min Power) which can be received by the electronic apparatus 200, and fourth data indicating the maximum value of the power (Max Power) which can be received by the electronic apparatus 200. The third data indicates, for example, the minimum value of the power which can be received by the electronic apparatus 200 via the power receiving antenna 203. The fourth data indicates, for example, the maximum value of the power which can be received by the electronic apparatus 200 via the power receiving antenna 203.

Figure 6:
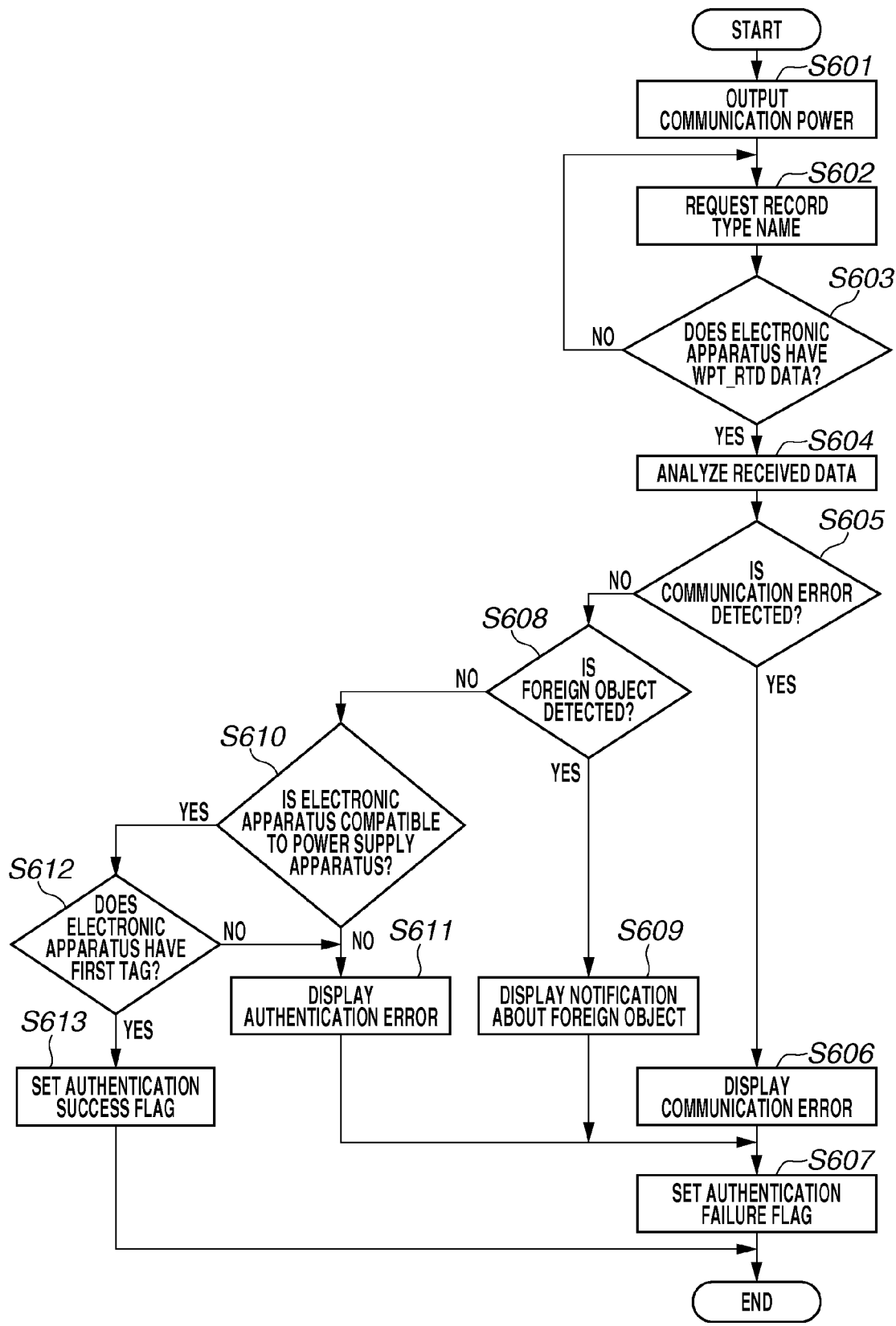
FIG. 6 is a flowchart illustrating an example of authentication process performed by the power supply apparatus according to the first exemplary embodiment.

In the first exemplary embodiment, when the power supply apparatus 100 performs the authentication process illustrated in FIG. 6, the control unit 101 acquires the power receiving capability data 407, instead of the power receiving capability data 404, from the electronic apparatus 200.

The setting process illustrated in step S712 in FIG. 7 performed by the power supply apparatus 100 according to the second exemplary embodiment will be described below with reference to FIG. 11.

<Setting Process>

The setting process illustrated in FIG. 11 is implemented when the control unit 101 executes a relevant computer program stored in the memory 108.

In step S1101, the control unit 101 compares the second data included in the power supply capability data 108b with the fourth data included in the power receiving capability data 407.

The control unit 101 determines, based on the result of the comparison, whether the maximum value of the power which can be supplied by the power supply apparatus 100 is larger than the maximum value of the power which can be received by the electronic apparatus 200.

When the maximum value of the power which can be supplied by the power supply apparatus 100 is determined to be larger than the maximum value of the power which can be received by the electronic apparatus 200 (YES in step S1101), the processing proceeds to step S1102. On the other hand, when the maximum value of the power which can be output by the power supply apparatus 100 is determined to be not larger than the maximum value of the power which can be received by the electronic apparatus 200 (NO in step S1101), the processing proceeds to step S1104.

In step S1102, the control unit 101 sets, based on the power receiving capability of the electronic apparatus 200, predetermined power. The control unit 101 sets, based on the third and the fourth data, the value of the predetermined power. For example, the control unit 101 sets the value of the predetermined power so as not to exceed the maximum value of the power which can be received by the electronic apparatus 200. The control unit 101 further sets the value of the predetermined power so as to be equal to or larger than the minimum value of the power which can be received by the electronic apparatus 200. The control unit 101 may further set the value of the predetermined power according to the efficiency of the power supply or the remaining capacity of the battery 211.

When the predetermined power has been set, the processing proceeds to step S1103.

In step S1103, similar to step S903, the control unit 101 sets a predetermined time period according to the predetermined power set by any one of steps S1102 and S1104.

The predetermined time period set by the processing in any one of steps S1102 and S1104, and the predetermined time set by the processing in step S1103 are recorded in the memory 108 as power supply parameters.

When the power supply parameters have been recorded in the memory 108, the processing proceeds to step S713.

In step S1104, the control unit 101 sets, based on the power supply capability of the power supply apparatus 100, the predetermined power. The control unit 101 sets, based on the first and the second data, the value of the predetermined power. For example, the control unit 101 sets the value of the predetermined power so as not to exceed the maximum value of the power which can be output by the power supply apparatus 100. The control unit 101 further sets the value of the predetermined power so as to be equal to or larger than the minimum value of the power which can be output by the power supply apparatus 100. The control unit 101 may further set the value of the predetermined power according to the efficiency of the power supply or the remaining capacity of the battery 211. When the predetermined power has been set, the processing proceeds to step S1103.

In the second exemplary embodiment, the power supply apparatus 100 sets the predetermined power according to the maximum value of the power which can be output by the power supply apparatus 100, and the maximum value of the power which can be received by the electronic apparatus 200. Thus, the excessive power supply by the power supply apparatus 100 to the electronic apparatus 200 can be prevented. Further, the power supply apparatus 100 sets the duration of the predetermined time period according to the value of the predetermined power. Thus, the power supply apparatus 100 having a larger value of the predetermined power communicates with the electronic apparatus 200 at shorter interval, achieving the power supply suitable for the status of the electronic apparatus 200.

In the power supply apparatus 100 and the electronic apparatus 200 according to the second exemplary embodiment, similar configurations and processes to those of the first exemplary embodiment have similar effects to those described in the first exemplary embodiment.

Although, in the first and the second exemplary embodiments, the power supply apparatus 100 supplies the predetermined power to the electronic apparatus 200 by using the power supply antenna 107, and performs communication between the first communication unit 106 and the electronic apparatus 200 by using the power supply antenna 107, the configuration is not limited thereto. For example, the power supply apparatus 100 may have an antenna for supplying the predetermined power to the electronic apparatus 200, and another antenna for performing communication between the first communication unit 106 and the electronic apparatus 200.

Although, in the first and the second exemplary embodiments, the electronic apparatus 200 receives power from the power supply apparatus 100 by using the power receiving antenna 203, and performs communication between the power supply apparatus 100 and the first communication unit 206 by using the power receiving antenna 203, the configuration is not limited thereto. For example, the electronic apparatus 200 may have an antenna for receiving power from the power supply apparatus 100, and another antenna for performing communication between the power supply apparatus 100 and the first communication unit 206.

Although the first communication unit 106 operates as a reader writer conforming to the NFC Standard, the configuration is not limited thereto. For example, the first communication unit 106 may operate on a Peer To Peer (P2P) basis conforming to the NFC Standard.

The predetermined power supply method may be other than a power supply method using the magnetic resonance method. For example, the predetermined power supply method may also be a power supply method conforming to a standard (for example, the "Qi" Standard) specified by the Wireless Power Consortium (WPC). The predetermined power supply method may also be a power supply method conforming to a standard specified by the Wireless Power Transmission (WPT). The predetermined power supply method may also be a power supply method conforming to a standard specified by the Consumer Electronics Association (CEA). The predetermined power supply method may also be a power supply method conforming to a standard specified by the Alliance for Wireless Power (A4WP).

When the power supply apparatus 100 outputs either one of the communication power and the predetermined power via the power supply antenna 107, the control unit 101 controls the matching circuit 105 to set the resonance frequency of the power supply antenna 107 to a predetermined frequency f. However, the configuration is not limited thereto.

For example, when the power supply apparatus 100 outputs the communication power via the power supply antenna 107, the control unit 101 may control the matching circuit 105 to set the resonance frequency of the power supply antenna 107 to 13.56 MHz. However, when the power supply apparatus 100 outputs the predetermined power via the power supply antenna 107, the control unit 101 may control the matching circuit 105 to set the resonance frequency of the power supply antenna 107 to 6.78 MHz.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-099550 filed May 9, 2013, which is hereby incorporated by reference herein in its entirety.

What is claimed is:

1. A power supply apparatus comprising:
a power supply unit configured to wirelessly supply power to an electronic apparatus;
a communication unit configured to wirelessly communicate with the electronic apparatus;
a setting unit configured to set, based on data indicating a category of power receivable by the electronic apparatus received from the electronic apparatus, power to be supplied to the electronic apparatus; and
a control unit configured to perform processing for supplying power set by the setting unit to the electronic apparatus via the power supply unit,
wherein the setting unit sets, based on a set power, a number of times of communication per unit time between the electronic apparatus and the communication unit,
wherein the control unit controls, based on the number of times of communication per unit time set by the setting unit, the communication unit to communicate with the electronic apparatus, and
wherein the number of times of communication per unit time is set higher as the set power is larger.

2. The power supply apparatus according to claim 1, wherein the setting unit sets a first power that is less than or equal a second power, as power to be supplied to the electronic apparatus, and wherein the second power is obtained based on the data.

3. The power supply apparatus according to claim 1, wherein the setting unit sets, based on status data received from the electronic apparatus by the communication unit, power to be supplied to the electronic apparatus.

4. The power supply apparatus according to claim 1, wherein the setting unit sets, based on first data indicating a category of power suppliable by the power supply unit and second data indicating a category of power receivable by the electronic apparatus, power to be supplied to the electronic apparatus.

5. The power supply apparatus according to claim 4, wherein, if a third power obtained based on the first data is greater than a fourth power obtained based on the second data, the setting unit sets a fifth power that is less than or equal to the fourth power, as power to be supplied to the electronic apparatus.

6. The power supply apparatus according to claim 4, wherein, if a sixth power obtained based on the second data is greater than a seventh power obtained based on the first data, the setting unit sets an eighth power that is less than or equal to the seventh power, as power to be supplied to the electronic apparatus.

7. The power supply apparatus according to claim 1, wherein the power supply unit wirelessly supplies, based on a frequency of 13.56 MHz, power to the electronic apparatus.

8. The power supply apparatus according to claim 1, wherein the power supply unit wirelessly supplies, based on a frequency of 6.78 MHz, the power to the electronic apparatus.

9. The power supply apparatus according to claim 1,
wherein the control unit performs processing for detecting a foreign object, and
wherein, if the foreign object is detected, the control unit performs processing for restricting power supply to the electronic apparatus via the power supply unit.

10. The power supply apparatus according to claim 1, wherein the control unit controls a communication interval of the communication unit, and
wherein the communication interval is set shorter as the set power is larger.

11. An electronic apparatus comprising:
a power receiving unit configured to wirelessly receive power from a power supply apparatus;
a communication unit configured to wirelessly communicate with the power supply apparatus;
a memory configured to store data indicating a category of power receivable by the power receiving unit;
a control unit configured to control the communication unit to transmit the data to the power supply apparatus if authentication with the power supply apparatus is completed; and
a generation unit configured to generate, based on power supplied from the power supply apparatus via the power receiving unit, direct current power after the data is transmitted to the power supply apparatus,
wherein the control unit communicates with the power supply apparatus at a predetermined number of times per unit time via the communication unit, and
wherein the number of times per unit time is higher as the power received via the power receiving unit is larger.

12. The electronic apparatus according to claim 11, wherein the control unit controls the communication unit to transmit the data to the power supply apparatus to allow the power supply apparatus to determine power to be supplied to the electronic apparatus.

13. A method comprising:
wirelessly supplying power to an electronic apparatus;
wirelessly communicating with the electronic apparatus;

setting, based on data indicating a category of power receivable by the electronic apparatus, power to be supplied to the electronic apparatus;

performing processing for supplying set power to electronic apparatus;

setting, based on a set power, a number of times of communication per unit time between the electronic apparatus and the communication unit; and controlling, based on the number of times of communication per unit time set by the setting unit, the communication unit to communicate with the electronic apparatus, wherein the number of times of communication per unit time is set higher as the set power is larger.

14. A method comprising:

wirelessly receiving power from a power supply apparatus;

wirelessly communicating with the power supply apparatus at a predetermined number of times per unit time;

transmitting data indicating a category of power receivable by the electronic apparatus to the power supply apparatus if authentication with the power supply apparatus is completed; and generating, based on power supplied from the power supply apparatus, direct current power after the data is transmitted to the power supply apparatus;

wherein the number of times per unit time is higher as the received power is larger.

15. A non-transitory computer-readable storage medium storing computer executable instructions for causing a computer to execute a method, the method comprising:

wirelessly supplying power to an electronic apparatus;

wirelessly communicating with the electronic apparatus;

setting, based on data indicating a category of power receivable by the electronic apparatus received from the electronic apparatus, power to be supplied to the electronic apparatus;

performing processing for supplying set power to the electronic apparatus;

setting, based on a set power, a number of times of communication per unit time between the electronic apparatus and the communication unit, and controlling, based on the number of times of communication per unit time set by the setting unit, the communication unit to communicate with the electronic apparatus, wherein the number of times of communication per unit time is set higher as the set power is larger.

16. A non-transitory computer-readable storage medium storing computer executable instructions for causing a computer to execute a method, the method comprising:

wirelessly receiving power from a power supply apparatus;

wirelessly communicating with the power supply apparatus at a predetermined number of times per unit time;

transmitting data indicating a category of power receivable by the electronic apparatus to the power supply apparatus if authentication with the power supply apparatus is completed; and generating, based on power supplied from the power supply apparatus, direct current power after the data is transmitted to the power supply apparatus, wherein the number of times per unit time is higher as the received power is larger.

* * * * *